May 14, 1935.  H. P. PHILLIPS  2,001,544
ANTIPISTON SLAP MEANS
Filed July 13, 1931   2 Sheets-Sheet 1
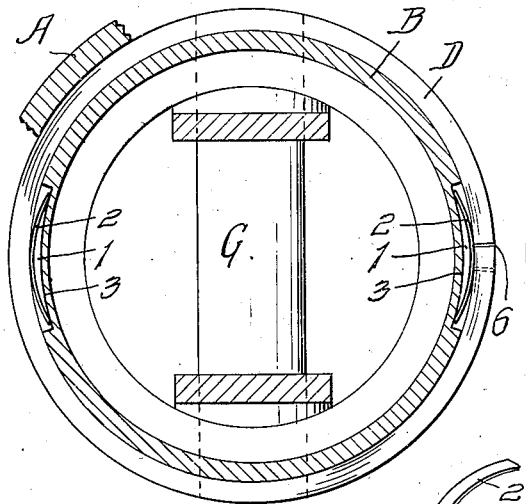
Fig. 1.
Fig. 2.
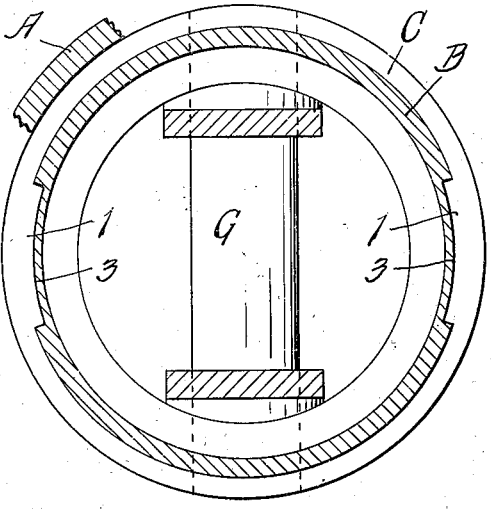
Fig. 3.
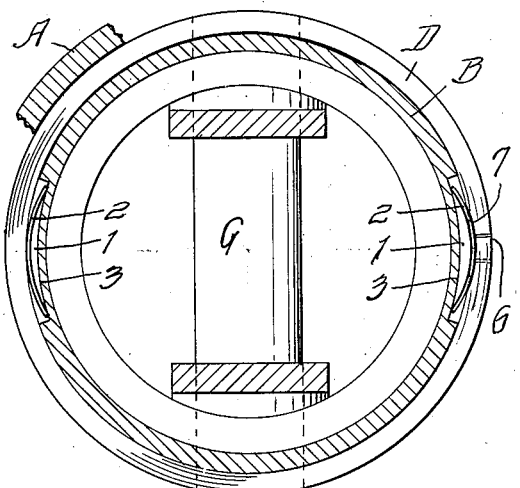
Fig. 4.
Fig. 5.
Fig. 6.
Fig. 7.
INVENTOR:
Harold P. Phillips.
BY Fred'k J. Harson,
ATTORNEY.

INVENTOR:
Harold P. Phillips.
BY
ATTORNEY.

Patented May 14, 1935

2,001,544

UNITED STATES PATENT OFFICE 2,001,544

ANTIPISTON SLAP MEANS

Harold P. Phillips, Maplewood, Mo.

Application July 13, 1931, Serial No. 550,374

3 Claims. (Cl. 309—5)

This invention relates to pistons fitted with rings for internal combustion engine cylinders, and, more especially to means associated with the piston and the rings to prevent so called piston slap within the engine cylinders.

The object of my invention is to effectively cure piston slap, compression loss, vibration, oil pumping, gas waste and like troubles now common to internal combustion engines, and, it is therefore a feature of my invention to provide each piston with a pair of resilient means interposed between the base of the ring grooves and the inner faces of the rings, particularly at right angles, or, where two pair of such means are employed, approximately at right angles to the longitudinal axis of the wrist pin carried by the piston.

I have found that piston slap is effectively cured by the employment of one pair of resilient members positioned on opposite sides of the longitudinal axis of the wrist pin, or in other words, the thrust sides of the piston, and that where expanders are employed to completely encircle the piston, too much heat is generated by the frictional contact of the rings with the wall of the cylinder, hence, it is an object of my invention to so position the piston anti slap means to eliminate heating of the motor from too tightly fitted piston rings, yet holding the rings tightly enough against the cylinder walls, especially on opposite sides of the wrist pin to eliminate the objectionable piston slap.

A still further object of the invention is the provision of anti piston slap means which possesses advantages in points of simplicity and efficiency, and at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, in which like characters of reference denote similar parts throughout the several views:

Fig. 1 is a transverse sectional view of a piston and part of a cylinder, the piston being equipped with a ring and my improved means for expanding the ring on opposite sides of the longitudinal axis of the wrist pin of the piston.

Fig. 2 is a perspective view of one of the ring expanders.

Fig. 3 is a transverse sectional view of a piston clearly illustrating the recessed ring grooves for accommodating the ring expanders.

Fig. 4 is a transverse sectional view of a piston equipped with a ring which has its inner face recessed at the split joint thereof for receiving the midsection of one of the ring expanders.

Fig. 5 is a detail of a part of a ring showing the recess in the inner face thereof at the split joint of the ring.

Fig. 6 is a side elevation of a piston equipped with rings shown in sectional elevation and also showing the recesses in the ring grooves on one side of the piston, one of said recesses being shown with a ring expander seated therein.

Fig. 7 is a further modified form of my sectional ring expander.

Figure 8:
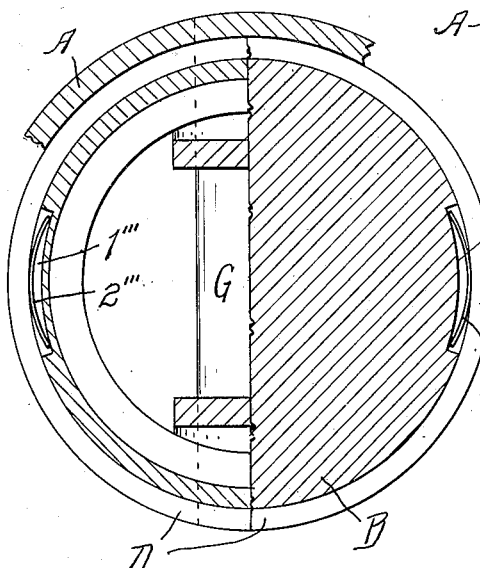
Fig. 8 is a sectional view taken on one-half of the piston on different planes, illustrating a further modification of the application of the piston centralizers.

Referring to the accompanying drawings, the reference character A designates an internal combustion engine cylinder in which a piston designated generally as B, is reciprocable. The piston is shown in Fig. 5 as having three ring grooves C, in which split rings D are disposed, and which may be of any conventional type. This view of the drawing also shows an oil ring groove E provided with oil openings e, and in which groove is shown disposed an oil ring F, which may be of any conventional type. Thus far, the construction of the piston, its ring grooves, and the rings disposed therein are not claimed as new by me as this is common in piston construction for internal combustion engines.

In carrying out the aim of my invention, I provide the inner wall of one or more of the ring grooves C with a plurality of short recesses designated 1. The recesses are preferably, although not necessarily, two in number, and are preferably disposed at right angles to the longitudinal axis of the wrist pin G carried by the piston so as to be on the thrust sides thereof, as clearly shown in Figs. 1 and 4. While I have shown but one ring groove recess 1 on opposite sides of the piston, two such recesses could be employed if desired, but I have found one recess 1 on opposide sides of the piston to be preferable.

My improved ring expander, one of which is seated in each ring groove recess 1, comprises a short strip of suitable resilient material, such for instance, as spring steel, which is arc shaped. The strip of spring steel forming a ring expander is designated 2 and such a device is clearly illustrated in Fig. 2, in its preferred form, and it is illustrated, in a modified form and designated 2' in Fig. 2, and a still further modified form of expander is designated 2" in Fig. 7.

In the preferred form of the invention, as shown in Fig. 1, there is a ring expander 2 for each ring groove recess 1 and each ring expander is disposed in its respective ring groove recess 1 with the ends thereof in contact with the inner face 3 thereof, and with the mid-section of its crown face engaging the inner face of a piston ring D.

Each ring expander 2 is preferably slightly widened at one end, as at 4, so that its side edges at the widened end thereof will frictionally engage the upper and lower walls of the ring groove recess 1 to prevent it slipping out of place when applying a piston ring to its receiving or ring groove C. In the modified form of ring expander, shown in Fig. 7, the mid-section thereof is bumped up slightly to form a curved head 5, thus this type of ring expander is not in the form of a true arc and provides for a more pronounced single point thrust contact with the inner face of the piston ring for holding the ring in contact with the cylinder wall.

In the embodiment of the invention shown in Fig. 1, the ring can rotate in the ring groove C of the piston B, but in the modification shown in Fig. 4, the ring at the split joint 6 thereof has its inner face provided with a short shallow curved recess 7 to receive the mid-section or crown surface of the ring expander 2, thus preventing rotation of the ring in the piston ring groove C of the piston B, due to the limited movement, if any, in reality, of the expander 2 in its receiving recess 1.

Figure 9:
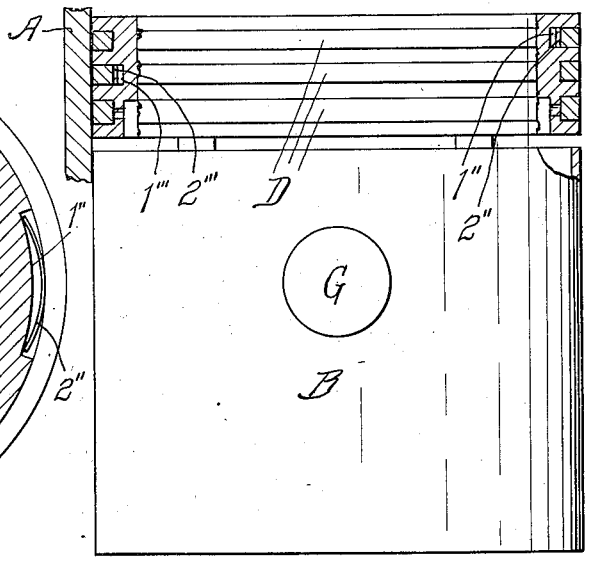
Fig. 9 is a view partly in side elevation and partly in sectional elevation of the modification shown in Fig. 8.

In the modification shown in Figs. 8 and 9, the piston B is provided with the usual ring grooves C and the split compressing rings D. The recesses in the modification are designated 1" and 1''', the upper ring groove being provided with recess 1" and the second groove being provided with the recess 1''' which latter recess is on the opposite side of the piston to that of recess 1" and both recesses are disposed at approximately a right angle to the longitudinal axis of the wrist pin G carried by the piston. An arc shaped ring expander designated 2" is seated in the ring groove recess 1" and an arc shaped ring expander 2''' is seated in the ring groove recess 1''' so as to exert an outward thrust against the one side only of each ring. The ring expanders being thus arranged, the two rings are expanded opposite sides to one another with substantially equal pressure, thereby causing the piston to reciprocate centrally of the cylinder.

Figure 10:
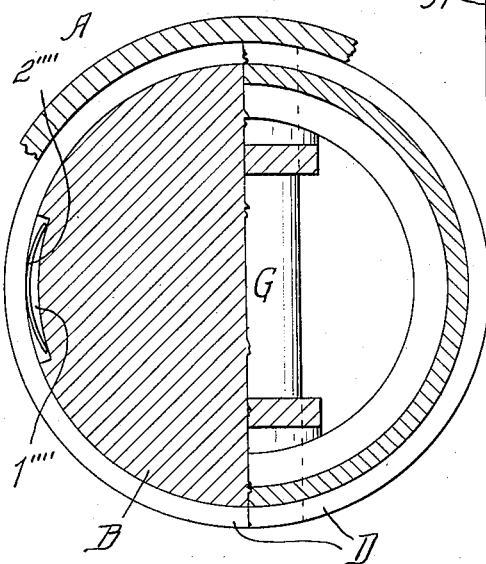
Fig. 10 is a sectional view on one-half of the piston on different planes, illustrating a still further modification of the application of the piston centralizers.
Figure 11:
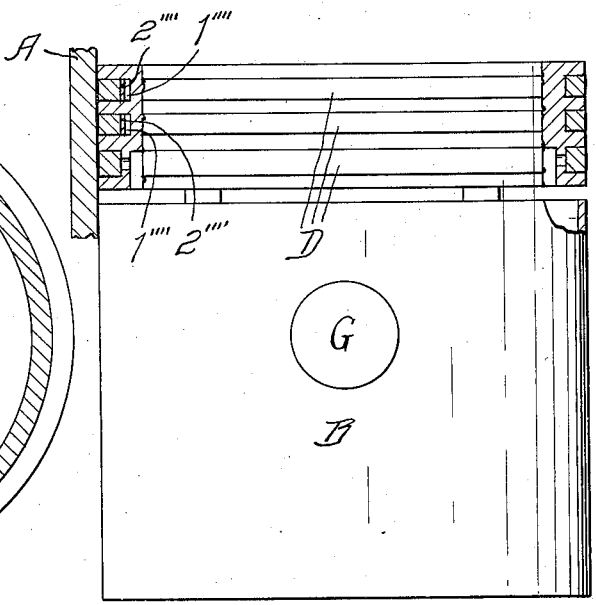
Fig. 11 is a view partly in side elevation and partly in sectional elevation of the modification shown in Fig. 10.

In the modification shown in Figs. 10 and 11, the piston B is provided with the usual ring groove C as in Figs. 8 and 9 and the split compression rings D. In this modification, however, the ring groove recesses, which in this case are designated 1'''' are all disposed on one side of the piston and to one side of the wrist pin carried by the piston.

In these modifications, each recess 1'''' is provided with an arc shaped resilient ring expander designated 2'''' which will, as is apparent, prevent piston slap, but will not necessarily allow the reciprocation of the piston exactly centrally of the cylinder.

In these two latter modifications, only half of the spring pressure will be exerted against the rings to hold them against the cylinder walls that is exerted against the rings in the other forms of the invention shown, but the pressure exerted against the rings, in either instance, is sufficient to prevent piston slap and also the tendency of the rings heating is also lessened as the friction contact of each ring with the cylinder wall is at only one point, as is manifest.

From the foregoing description, it is evident that I provide an effective means, easy of application, to prevent piston side slap and thereby effectively reduce compression loss and oil pumping as the sectional resilient means tends to urge the rings on opposite sides of the longitudinal axis of the wrist pin against the cylinder walls at points found to be most effective for the purpose intended and which due to their size in comparison with the present types of ring expanders, lends itself to cheapness in cost, both as to manufacture and installation.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In combination with a piston and a one piece split ring fitted in the groove thereof, of a pair of piston centralizers each comprising a short strip of arc shaped resilient material with the ends thereof seated in grooves milled in the base of the ring groove and each pair of centralizers disposed diametrically opposite each other to exert an outward thrust against the fitted ring at diametrically opposite points and at a right angle to the longitudinal axis of the wrist pin carried by the piston.

2. In combination with a piston for internal combustion engines having piston ring grooves and split rings fitted therein, of recesses formed in the side walls of the ring grooves on opposite sides of the longitudinal axis of the wrist pin carried by the piston, an arc shaped resilient ring expander seated in each recess and each ring having its inner face recessed on opposite sides of the split joint thereof and in which recess the midway section of one of the ring expanders for each ring is seated to prevent rotation of the ring in its piston ring groove.

3. In combination with a piston having a ring receiving groove and a split ring mounted therein, said piston having a pair of short diametrically opposed circumferential recesses formed in the base of the ring groove on the thrust sides of the piston only and flexible resilient arc shaped members positioned in the ring groove recesses to prevent circumferential displacement of the arc shaped members and to cause radial pressure of the arc shaped members against the ring at two diametrically opposite points on the thrust sides of the piston.

HAROLD P. PHILLIPS.